United States Patent [19]

Nespor

[11] Patent Number: 4,674,943
[45] Date of Patent: Jun. 23, 1987

[54] VEHICLE LIFTING AND TOWING DEVICE

[76] Inventor: Ronald R. Nespor, c/o Chevron Inc., R.D. 7, Rt. 62, Mercer, Pa. 16137

[21] Appl. No.: 757,869

[22] Filed: Jul. 23, 1985

[51] Int. Cl.⁴ ............................................... B60P 3/12
[52] U.S. Cl. .................................... 414/563; 280/402; 414/917
[58] Field of Search ........................ 414/563, 429, 917; 280/402

[56] References Cited

U.S. PATENT DOCUMENTS

| | | | |
|---|---|---|---|
| 3,700,123 | 10/1972 | Corley, Jr. ....................... | 414/917 X |
| 3,924,763 | 12/1975 | Pigeon .................................. | 414/563 |
| 4,384,817 | 5/1983 | Peterson ............................... | 414/563 |
| 4,451,193 | 5/1984 | Cannon, Jr. et al. ............ | 280/402 X |
| 4,473,237 | 9/1984 | Lind ................................. | 414/563 X |
| 4,473,334 | 9/1984 | Brown ............................ | 280/402 X |
| 4,557,496 | 12/1985 | Sill ........................................ | 280/402 |
| 4,564,207 | 1/1986 | Russ et al. ........................ | 414/563 X |

Primary Examiner—Frank E. Werner
Assistant Examiner—Stuart J. Millman
Attorney, Agent, or Firm—Staas & Halsey

[57] ABSTRACT

A wheel lift type vehicle lifting and towing device which includes an extensible and tiltable boom extending rearwardly from a towing vehicle when in use and provided on its end thereof with a pair of wheel receiving members for engaging the wheels of a vehicle to be towed, and then lifting and towing the vehicle. The wheel receiving members are comprised of a fixed prong and a movable L-shaped prong which may be folded to a storage position when not in use. When the entire device is in a storage position, it is retracted substantially out of view within the understructure of the body of the towing vehicle.

22 Claims, 14 Drawing Figures

VEHICLE LIFTING AND TOWING DEVICE

BACKGROUND OF THE INVENTION

1. Field of the Invention

The present invention relates to an improved device for lifting and towing vehicles and, more particularly, to such a device wherein an extensible and tiltable boom extends rearwardly from a towing vehicle and is provided on the end thereof with a pair of wheel receiving members for engaging the wheels of a vehicle to be towed and then lifting and towing the vehicle. When the device is not in use, it is retracted substantially out of view to a storage position substantially within the understructure of the body of the towing vehicle.

2. Description of the Related Art

A prior known type of towing vehicle generally employs a crane, a winch and a cable having a hook at its end for attachment to the bumper of a vehicle whereby the vehicle is raised by retracting the cable and raising the crane. This type of lift and towing device for disabled vehicles, however, can often lead to undesirable damage to elements of the vehicle being towed. As a result, a type of vehicle towing and lifting apparatus has been developed that engages the front or rear wheels of a vehicle and then lifts the vehicle after securing the wheels of the vehicle in some form of wheel or tire receiving member.

While wheel lift type towing and lifting devices have been known in the art for some time, these devices generally extend beyond the rear of the body of the towing vehicle. This not only is unsightly but can often constitute a safety hazard. In addition, many of such devices preclude the use of the conventional hoisting apparatus of the towing vehicle. Devices of this type wherein the towing and lifting device extends beyond the rear of the towing vehicle when not in use are shown, for example, in BROWN, U.S. Pat. No. 4,473,334; PETERSON, U.S. Pat. No. 4,384,817; LIND, U.S. Pat. No. 4,473,237 and PIGEON, U.S. Pat. No. 3,924,763. Other wheel lift type towing and lifting devices include a boom which pivots upwardly and forwardly to rest on top of the bed of the towing vehicle. An example of this type construction is shown in CANNON et al., U.S. Pat. No. 4,451,193. While this type of construction does not have as much of the device extending from the rear of the vehicle, it nevertheless includes unsightly hoses and other elements at the rear of the vehicle which could be snagged or otherwise damaged when not in use. In still other prior art wheel lift towing and lifting devices, a cumbersome apparatus is required to engage the wheels or tires of a vehicle to be towed.

SUMMARY OF THE INVENTION

It is an object of the present invention to provide a wheel lift type vehicle towing and lifting device that can be attached to the understructure of a towing vehicle and which may be extended out into an operative position to engage the wheels of a vehicle to be lifted and towed but which may be conveniently retracted out of sight into a storage position substantially within the understructure of the body of the towing vehicle when not in use.

It is another object of the present invention to provide a wheel lift type vehicle lifting and towing device which does not interfere with normal operation of a conventional hoisting crane mounted on the towing vehicle.

It is a further object of the present invention to provide a wheel lift apparatus which may be stored in a position substantially within the understructure of the towing vehicle body when not in use but which may be conveniently extended out into an operative position to readily receive and engage the wheels of a vehicle to be lifted and towed.

It is still a further object of the present invention to provide a wheel lift type vehicle lifting and towing device employing an extensible boom whereby the angle of the boom may be directed in a downward slope to a specified position or angle to ensure sufficient clearance between the wheel receiving members attached to the end of the boom and the understructure of the vehicle being towed to avoid any damage thereto.

It is a further object of the present invention to provide a wheel lift type veicle lifting and towing device wherein the wheel receiving and engaging members include a fixed prong and a pivotable prong, and wherein the pivotable prong may be retracted to initially engage the wheel with the fixed prong and, subsequently, the pivotable prong may be pivoted into engagement with the wheel to fixedly secure the wheel for lifting and towing of the vehicle.

The present invention achieves the above objects by providing a wheel lift type lifting and towing device for attachment to the rear of the body of a towing vehicle. The wheel lift device includes a boom pivotally mounted to the towing vehicle, means for extending and retracting the boom between a storage position underneath the towing vehicle and an operating position extending out from the rear of the towing vehicle, means for raising and lowering the boom as well as controlling the angle of the downward slope of the boom when in an operating position, and a pair of wheel or tire receiving members mounted on a crossbar pivotally mounted to the rear end of the boom. Each of the wheel receiving members comprises a fixed prong and a movable prong with means for pivoting the movable prong between a closed storage position and an open wheel receiving position for receiving and engaging a wheel of a vehicle to be towed. When not in use, the entire lifting and towing device may be retracted substantially out of sight within the understructure of the body of the towing vehicle.

These, together with other objects and advantages, which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
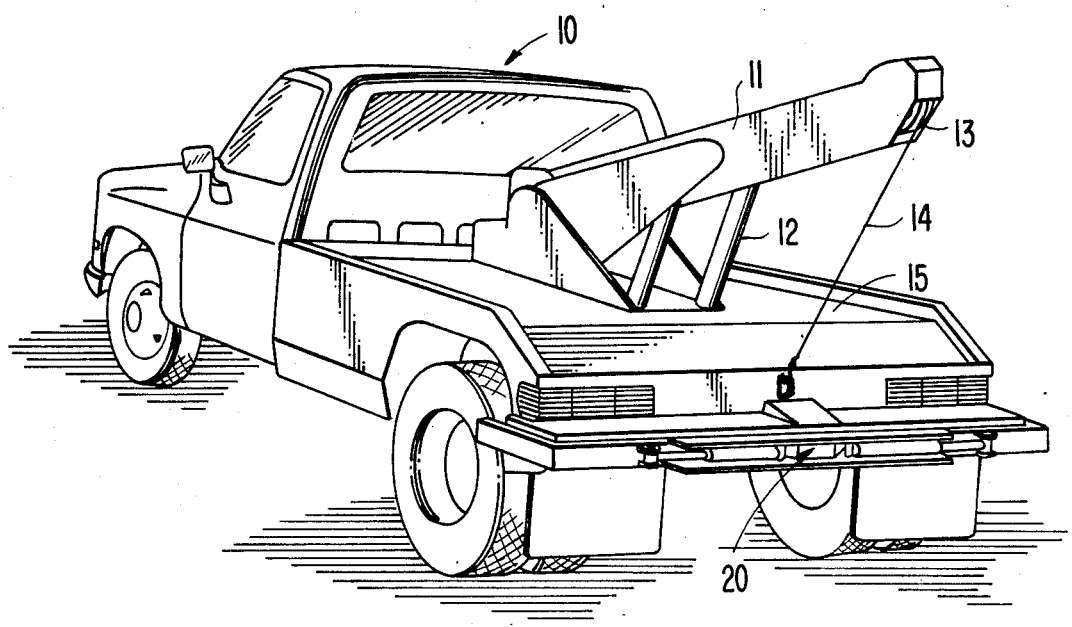
FIG. 1 is a perspective view of a tow truck or vehicle provided with a lifting and towing device according to the present invention showing the device in its retracted, storage position within the understructure of the towing vehicle.

Referring to the drawings, shown in FIG. 1 is a towing vehicle 10 having a conventional crane or hoist 11 pivotally mounted to the top of the front portion of the bed of the truck and which may be tiltably raised and lowered by power means such as hydraulic cylinders 12. The free end of the crane 11 is provided with one or more pulleys 13 about which one or more cables 14 are trained. As further shown in FIG. 1, attached to the understructure of the towing vehicle at the rear thereof is a wheel lift type vehicle lifting and towing apparatus indicated generally by the numeral 20 and is shown in a retracted storage position out of view. As shown in FIG. 1, the device when in the retracted position neatly fits within the understructure of the towing vehicle body without any unsightly booms, hoses, connections or the like protruding therefrom.

Figure 5:
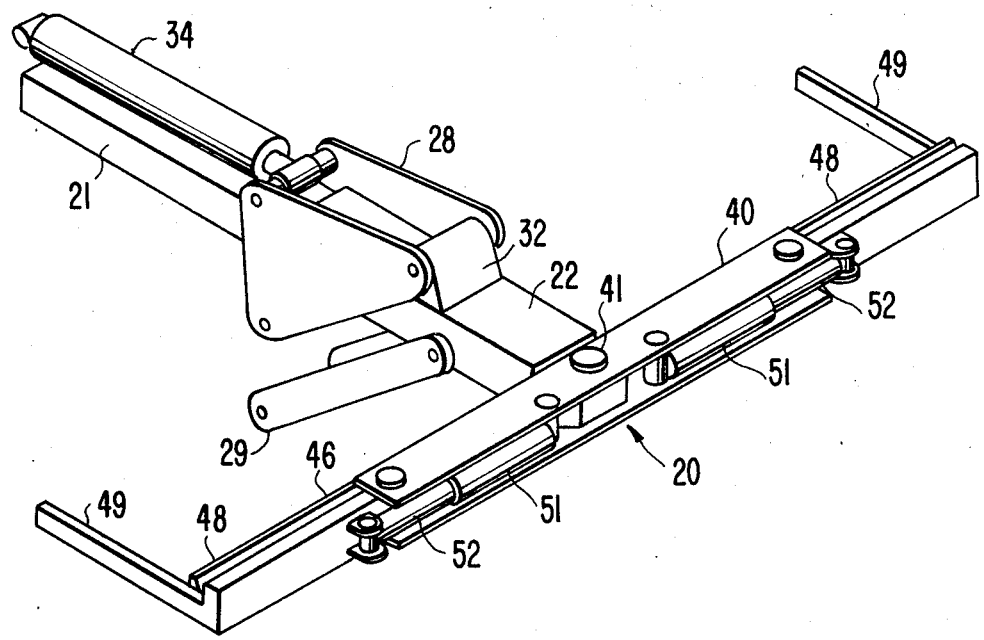
FIG. 5 is a perspective view showing the essential elements of the vehicle lifting and towing device in a retracted position.
Figure 7:
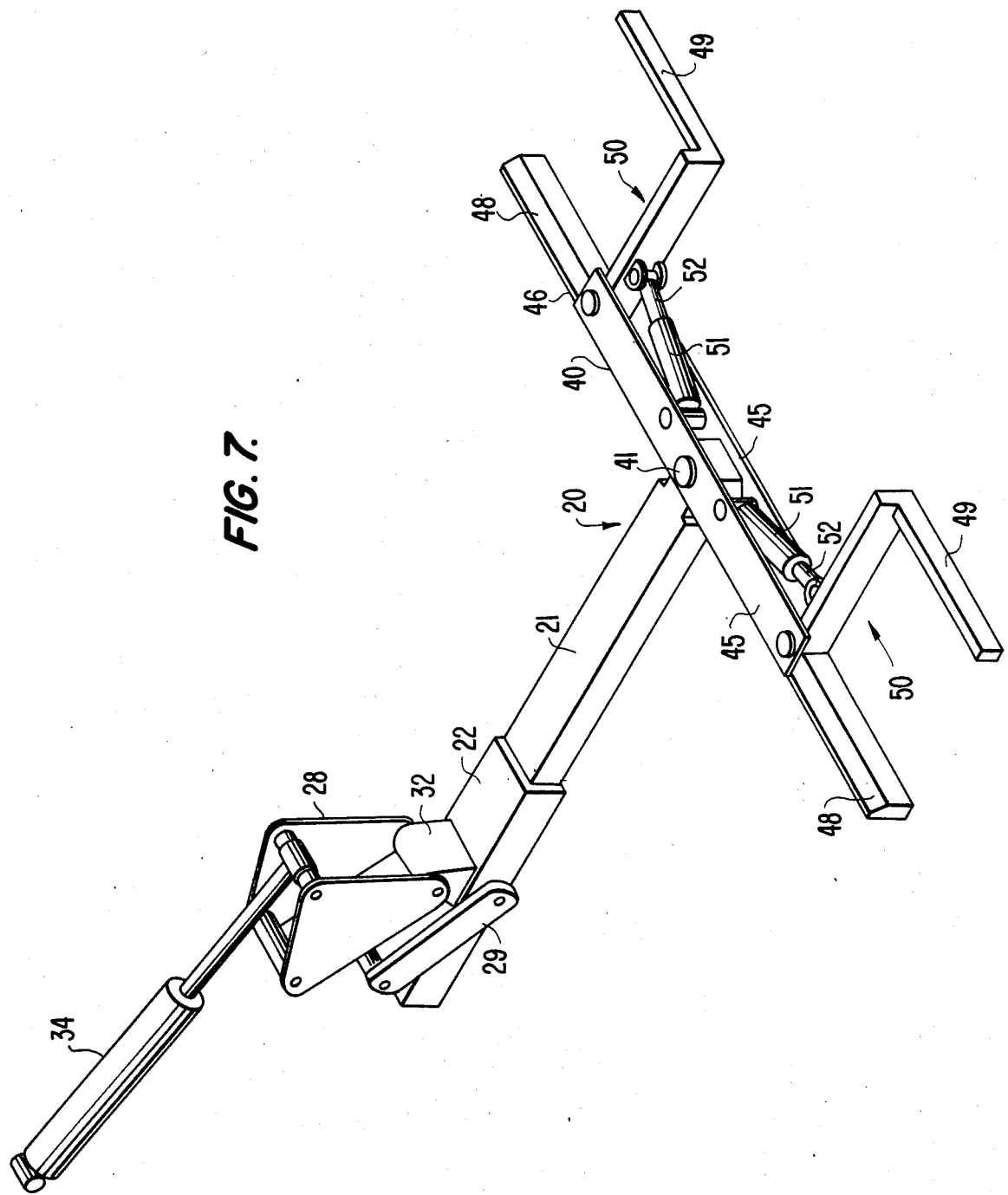
FIG. 7 is a perspective view of the essential parts of the vehicle lifting and towing device extended out in an operative position.
Figure 10:
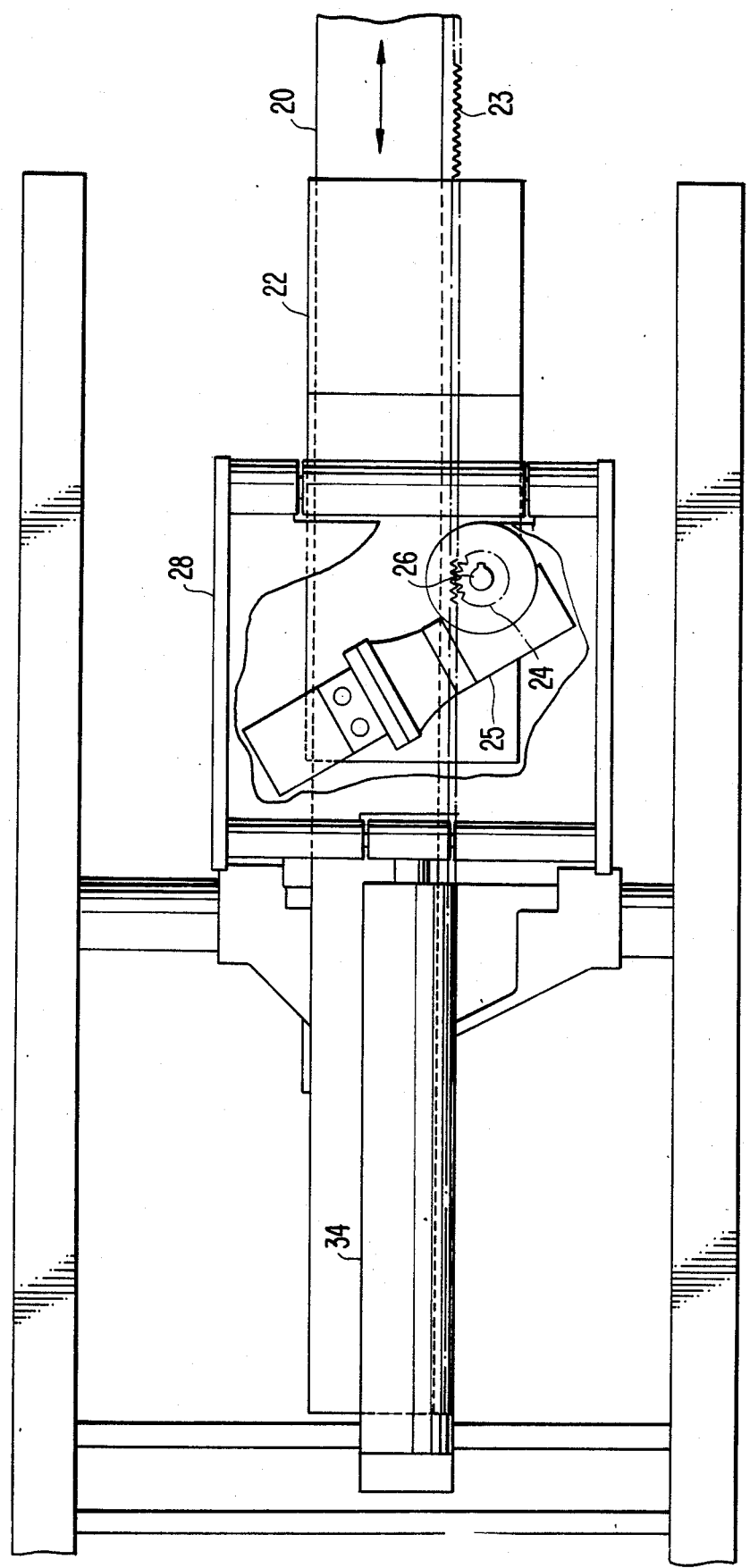
FIG. 10 is a top plan view, partially broken away, showing the hydraulic gear driven rack and pinion assembly for extending and retracting the boom.
Figure 11:
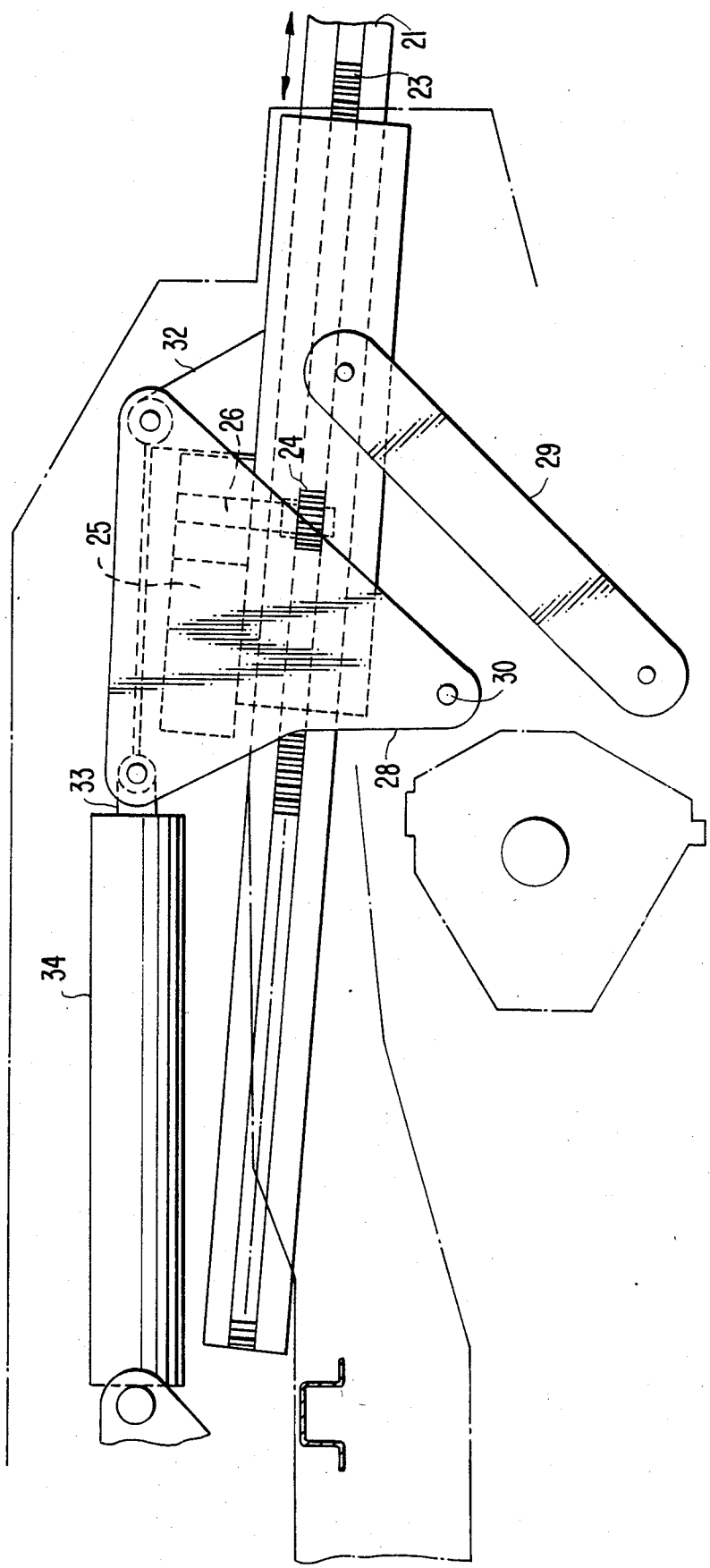
FIG. 11 is a side elevational view of the mounting and operating mechanisms for the boom.

Referring to FIGS. 5 and 7, the vehicle lifting and towing device 20 comprises an extensible boom 21 slidably received within a rectangular, tubular mounting or sleeve 22. As best shown in FIGS. 10 and 11, the boom 21 is provided with a rack 23 on one side thereof for cooperation with a pinion 24 to exend and retract the boom through sleeve 22. The pinion 24 is rotated in the forward and reverse direction by any suitable power means such as hydraulic motor 25 operatively connected to pinion 24 by shaft 26. Sleeve 22 is pivotally mounted to a subframe assembly 27 (shown in FIG. 9) by means of a pivoting triangular arm 28 and a pair of spaced, pivotally mounted, elongated arms 29. Subframe assembly 27 is fixedly attached to the frame of towing vehicle 10.

Figure 9:
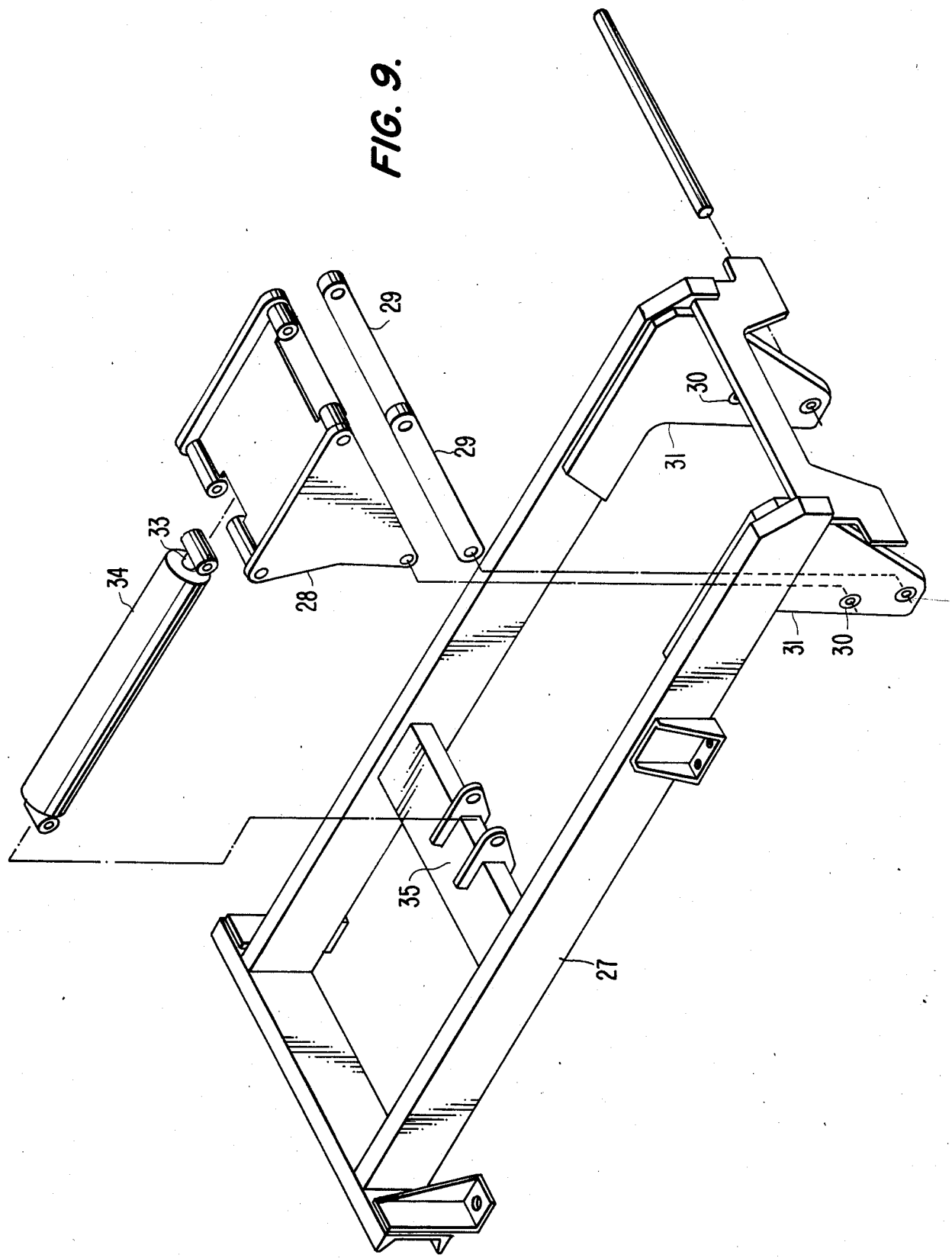
FIG. 9 is a perspective view showing the subframe of the device and the manner in which the hydraulic controls and mountings for the boom are attached to the subframe.

As best shown in FIGS. 9 and 11, each side plate of triangular arm 28 is pivotally attached at the bottom at pivot points 30 to plates 31 attached to subframe assembly 27. The upper front portion of triangular arm 28 is pivotally connected to upstanding hub 32 mounted on the top of sleeve 22. The back upper portion of triangular arm 28 is pivotally connected to piston rod 33 of a two-way hydraulic cylinder 34. Cylinder 34 is pivotally connected at its back end to cross brace 35 forming part of the subframe assembly 27. Both elongated arms 29 are pivotally connected at their bottom ends to plates 31 of the subframe assembly 27 and at their upper ends are pivotally connected to sleeve 22. With this arrangement, extension of the piston rod 33 forwardly tilts the boom 21 downwardly and retraction of the piston rod 33 causes the triangular arm 28 to pivot backwardly and correspondingly raise boom 21. A significant advantage of this arrangement is that the angle of the downward slope of boom 21 may be positively controlled to maintain boom 21 at a desired downward slope or angle during towing of a vehicle.

Figure 8:
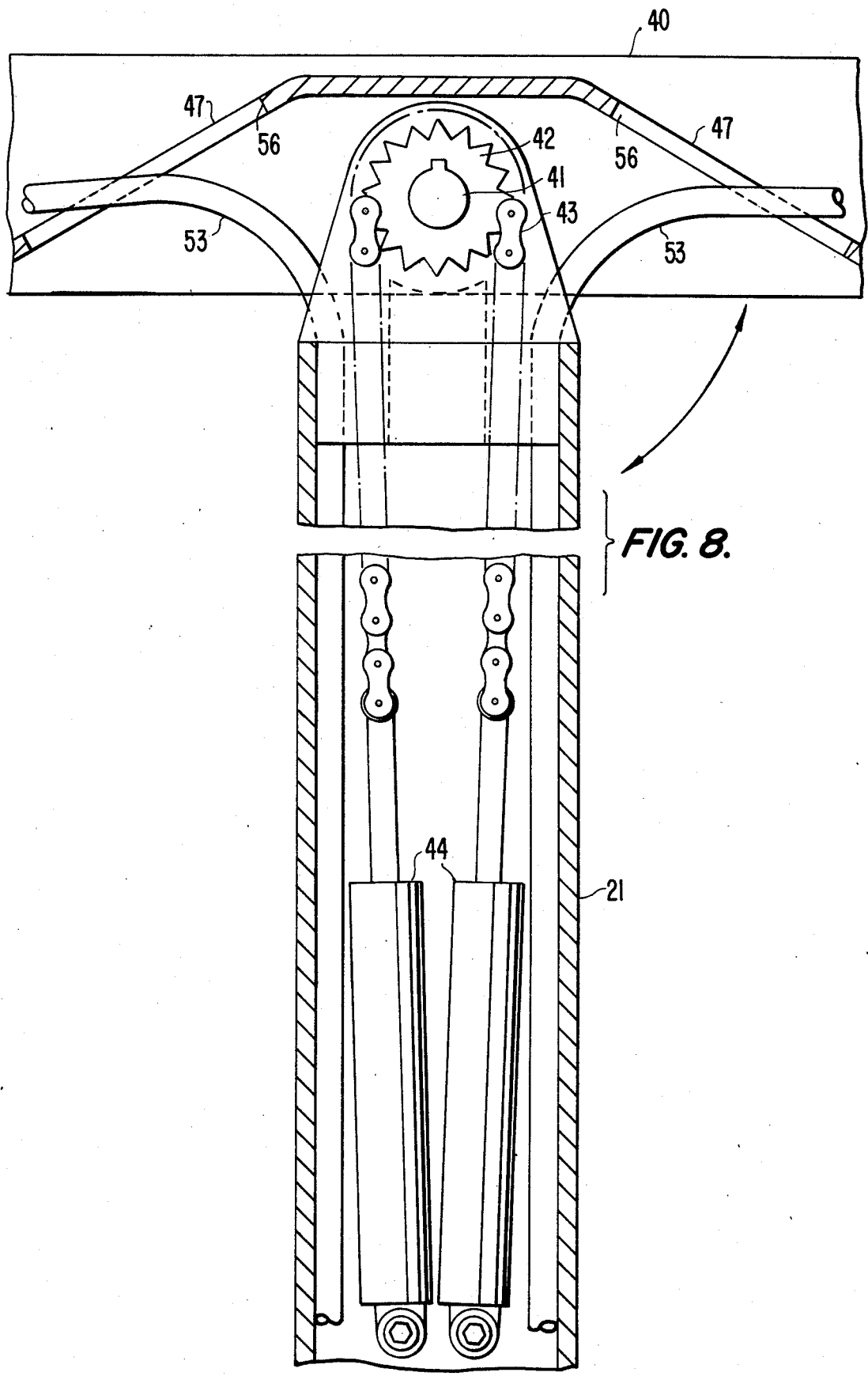
FIG. 8 is a top sectional plan view of the rear end of the boom and a portion of the crossbar showing the biasing means for normally maintaining the crossbar perpendicular to the boom.

A crossbar 40 is pivotally attached to the rear end of the boom 21 by a suitable pin or shaft 41. As shown in FIG. 8, a sprocket 42 is mounted on shaft 41 for engagement with a chain portion 43, both ends of which are connected to tensioning means such as springs in cylinders 44 mounted inside the hollow center of boom 21 adjacent the rear end thereof. With this arrangement, the biasing means in cylinders 44 function to normally maintain crossbar 40 in a position perpendicular to the longitudinal axis of boom 21 as shown in FIG. 8, while still permitting crossbar 40 to pivot about the verticle axis of shaft 41 when necessary to properly position the crossbar.

Figure 6:
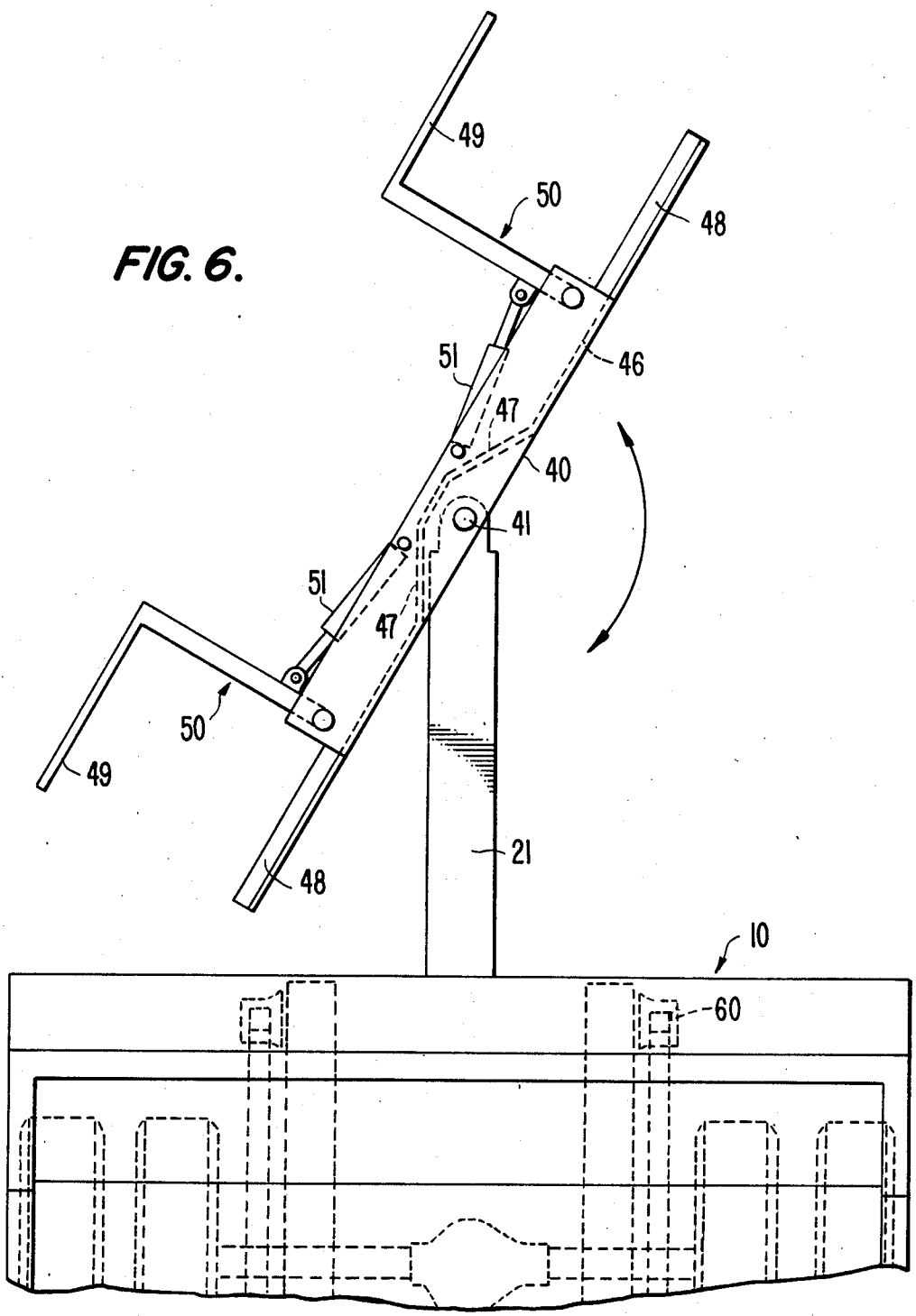
FIG. 6 is a top plan view of the device showing the boom extended, the prongs of the wheel receiving members in an operative position and the crossbar pivoted at an angle.
Figure 14:
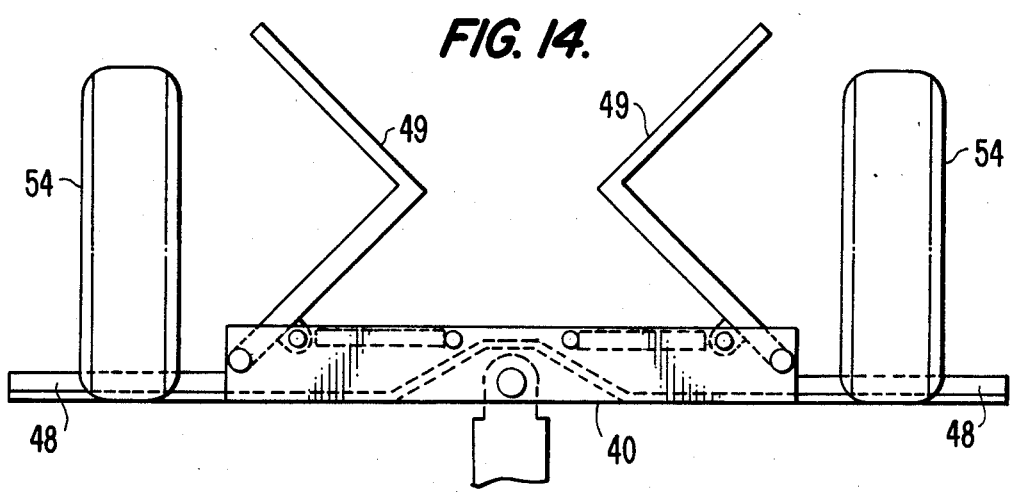

Crossbar 40 is comprised of a pair of upper and lower plates 45 and a back plate 46 as best shown in FIGS. 5 and 7. Back plate 46 is recessed or bent inwardly in a cut-off, V-shaped configuration with the sides 47 of the V-shaped configuration forming stop means for limiting the degree of pivotal movement of crossbar 40 as shown in FIG. 6. The outer ends of back plate 46 extend beyond upper and lower plates 45 to form a fixed prong 48 on each end of the crossbar 40. A movable prong 49 is pivotally attached between upper and lower plates 45 of the crossbar 40 at each end thereof. Fixed prong 48 and movable prong 49 form a tire or wheel receiving member 50 at each end of crossbar 40 when movable prong 49 is in an open position as shown in FIGS. 6 and 7. Movable prong 49 is pivotable between a closed storage position as shown in FIG. 5 and an open tire receiving and engaging position as shown in FIGS. 7 and 14 by a pair of two-way hydraulic cylinders 51 pivotally connected to the movable prongs 49 by a pair of piston rods 52. As shown in FIG. 8, hydraulic fluid hoses 53 connected to a source of fluid supply extend through the center of boom 21 out through the rear end thereof and pass through openings in portions 47 of back plate 46 to connect with the hydraulic cylinders 51. The openings 56 permit the crossbar to pivot in either direction without damaging the hoses 53.

Figure 4:
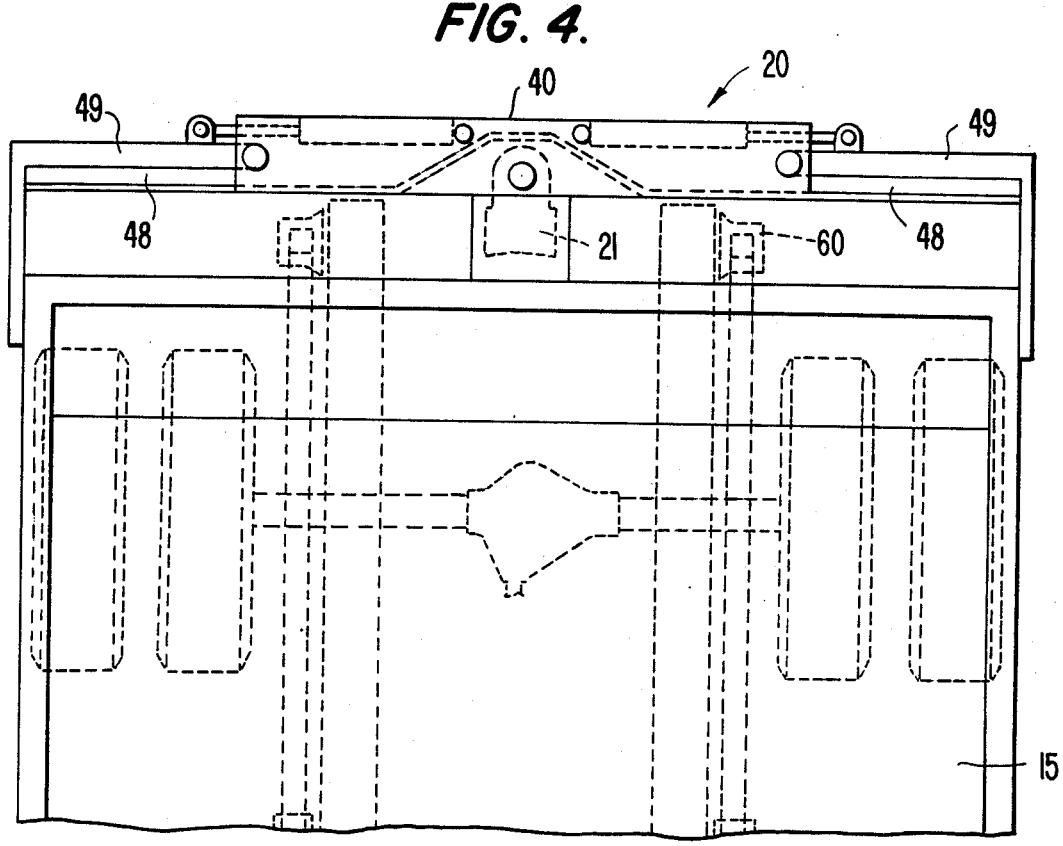
FIG. 4 is a top plan view of the rear end of the towing vehicle showing the lifting and towing device in its retracted position.

Movable prongs 49 are in an L-shaped configuration, whereby when the movable prongs are moved to a closed storage position, the inner leg of the L is in abutting relationship with fixed prong 48 and the outer leg of the L extends forwardly from the end of the fixed prong as shown in FIG. 5 so that the prong assembly may conveniently fit substantially within the understructure of the body of the towing vehicle 10 when the vehicle lifting and towing device is in a storage position as shown in FIG. 1. In this position, the fixed prong abuts or is adjacent the rear end of the vehicle body and the legs of each movable prong wrap around a corner of the body as shown in FIGS. 1 and 4. Moreover, as shown in FIG. 4, when the towing device is in a storage position, crossbar 40 abuts the rear end of the towing vehicle body at a point adjacent the rear spring hangers 60 of the vehicle.

Figure 2:
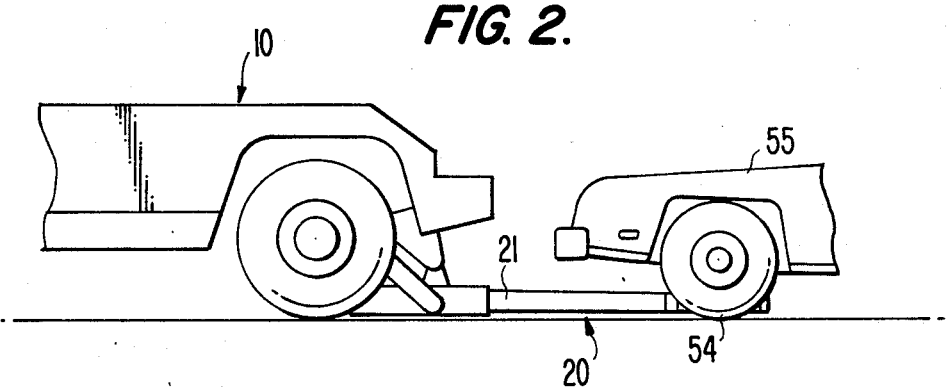
FIG. 2 is a partial, side elevational view showing the lifting and towing device of the present invention extended out and initially engaging the wheel of a vehicle to be towed.
Figure 12:
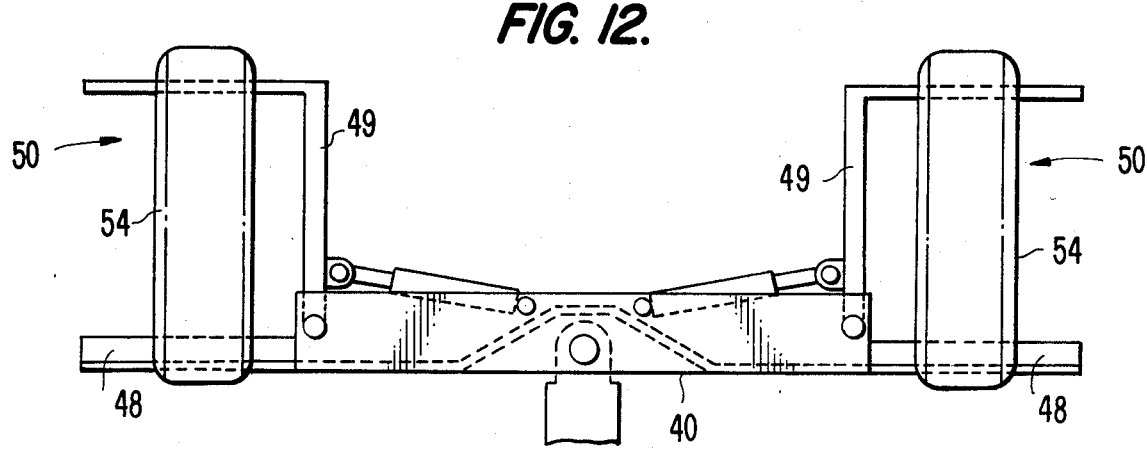
FIGS. 12, 13 and 14 are top plan views showing successive positions of the prongs of the wheel receiving members during engagement with the wheels of a vehicle.
Figure 13:
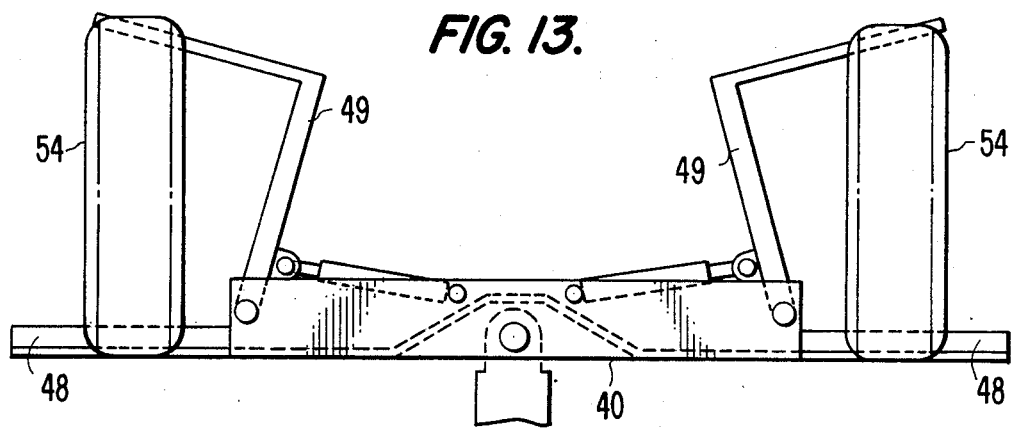

In operation of the vehicle lifting and towing device of the present invention, when the wheels 54 of a vehicle 55 are to be engaged, the towing truck is first positioned adjacent a vehicle to be towed. Boom 21 is then extended rearwardly by operation of the rack and pinion assembly 23, 24. After the boom 21 has been extended rearwardly the desired distance, hydraulic cylinder 34 is actuated to pivot triangular arm 28 forwardly to lower the boom to ground level. At the same time, the movable prongs 49 are pivoted by operation of the hydraulic cylinders 51 from the closed storage position shown in FIG. 5 to a fully opened position shown in FIG. 14 and the entire crossbar assembly is then moved into position whereby the fixed prongs 48 engage the tires or wheels of a vehicle to be towed. As shown in FIG. 14, the movable prongs 49 are capable of being pivoted a sufficient distance inwardly whereby both prongs will fit between wheels of the vehicle to be towed As shown in FIGS. 12 and 13, once the fixed prongs 48 engage the wheels of the vehicle, the movable prongs 49 are then pivoted outwardly by cylinders 51 until the outer leg of L-shaped prong 49 firmly engages the tire or wheel 54 of the vehicle. At this point, as shown in FIG. 2, the boom 21 is still in the downward position adjacent ground level. While the wheel receiving members 50 formed by the fixed and movable prongs are able to securely engage the wheels of a vehicle, additional straps (not shown) also preferably are connected to the wheel to further secure the wheel thereon.

Figure 3:
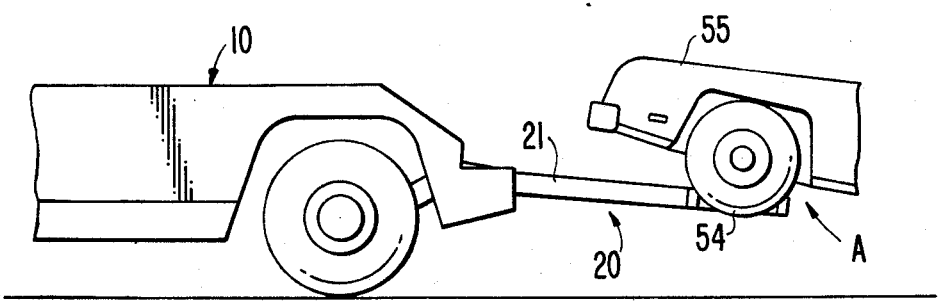
FIG. 3 is a partial, side elevational view showing the lifting and towing device engaging and lifting a vehicle.

To commence lifting of the vehicle, hydraulic cylinder 34 is actuated to pivot triangular arm 28 backwardly and thereby lift boom 21 and the vehicle upwardly as shown in FIG. 3. The amount of the angle of the downward slope of boom 21 when in a raised position may be set to a desired position by controlling the pivotal movement of triangular arm 28 whereby a downward slope of boom 21 is achieved as shown in FIG. 3 which permits sufficient clearance between the end of the wheel receiving members 50 and the body of the vehicle as shown at point A in FIG. 3. This is advantageous in that sufficient clearance is achieved between the end of the wheel receiving members and the various components of the vehicle body to avoid any undesirable damage to the components of the vehicle. After the vehicle has been towed to a desired location, boom 21 is then lowered to ground level and the sequence of steps shown in FIGS. 12 through 14 is reversed and the movable prongs 49 are disengaged from the tire. The entire lifting and towing device assembly may then be retracted out of view within the understructure of the body of the towing vehicle as shown in FIG. 1.

Suitable control means may be provided either in the cab of the towing vehicle or adjacent the rear end of the body of the vehicle or in both places to control operation of the device. It is also noted that since the crossbar is pivotally connected to the end of the boom, the angle of the crossbar may be adjusted to facilitate engagement of the wheels of the vehicle when an angular position is required.

It is apparent from the above detailed description that many advantageous features are provided by the present invention. A vehicle lifting and towing device is disclosed which, when not in use, is designed to be stored substantially out of view within the understructure of the body of the towing vehicle without any undesirable parts such as hoses, boom, wheel receiving members and the like extending out from the rear of the towing vehicle. Moreover, the wheel receiving members are easily positioned to enage the wheels of a vehicle to be towed and as well are adjustable to fit various sized vehicles and tires. Moreover, the lifting device can be accurately controlled to avoid damage to the body of the vehicle being towed during operation. Additionally, the vehicle lifting and towing device may be incorporated into the body of a conventional towing vehicle without interferring with the normal operation of the crane of the vehicle.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

What is claimed is:

1. A vehicle lifting and towing device for attachment to the rear of the body of a towing vehicle comprising:
    a booom pivotally mounted to said towing vehicle, said boom having a front end and a rear end;
    means for moving said boom between a storage position wherein said boom is confined within the understructure of the body of said towing vehicle and an operating position wherein said boom extends out from the rear of said body;
    a pair of wheel receiving member attached to the rear end of said boom, each said wheel receiving member comprising a fixed prong and a movable L-shaped prong having an inner leg and an outer leg; and
    means for pivoting said movable prong between a closed storage position and an open tire receiving position for receiving and engaging a wheel of a vehicle to be towed; and
    wherein when said boom is in said storage position and said movble prongs are in said closed position, said fixed prongs are adjacent the rear end of said body and said legs of each movable prong wrap around a corner of said vehicle body.

2. A vehicle lifting and towing device as recited in claim 1, wherein said means for moving said boom includes a rack and pinion assembly for extending and reacting said boom.

3. A vehicle lifting and topwing device as recited in claim 2, further comprising a triangular arm pivotally attached to said vehicle body within the understructure thereof and said boom and means for pivoting said triangular arm to raise and lower said boom.

4. A vehicle lifting and towing device as recited in claim 3, wherein the angle of said boom is in a downward slope when said boom is in an extended, raised position during lifting and towing of a vehicle and is controlled by said triangular arm.

5. A vehicle lifting and towing device as recited in claim 1, further comprising a crossbar pivotally mounted to the rear end of said boom, one of said wheel receiving members being mounted at each end of said crossbar and biasing means for normally maintaining said crossbar perpendicular to said boom.

6. A vehicle lifting and towing device as recited in claim 5, wherein, said biasing means is mounted inside of said boom and is operatively connected to said crossbar.

7. A vehicle lifting and towing device as recited in claim 5, further comprising stop means on said crossbar for limiting the pivotal movement of said crossbar.

8. A vehicle lifting and towing device for attachment to the rear of the body of a towing vehicle comprising:
   a boom pivotally mounted to said towing vehicle, said boom having a front end and a rear end;
   a cross bar pivotally mounted to the rear end of said boom;
   a wheel receiving member mounted at each end of said cross bar;
   means for raising and lowering said boom; and
   a rack and pinion assembly for extending and retracting said boom between a storage position wherein said boom is confined with the understructure of the body of said towing vehicle and said cross bar buts the rear end of said towing vehicle body and an operating positon wherein said boom extends out from the rear of the body.

9. A vehicle lifting and towing device as recited in claim 8, wherein said means for raising and lower in said boom comprises a triangular arm pivotally attached to said vehicle body within the understructure thereof and said boom and means for pivoting said triangular arm.

10. A vehicle lifting and towing device as recited in claim 9, wherein the angle of said boom is in a downward slope when said boom is in an extended, raised position during lifting and towing of a vehicle and is positively controlled by said triangular arm.

11. A vehicle lifting and towing device as recited in claim 8, further comprising a biasing means for normally maintaining said crossbar perpendicular to said boom.

12. A vehicle lifting and towing device as recited in claim 11, wherein said biasing means is mounted inside of said boom and is operatively connected to said cross bar.

13. A vehicle lifting and towing device as recited in claim 12, further comprising a stop means on said crossbar for limiting the pivotal movement of said crossbar.

14. A vehicle lifting and towing device for attachment to the rear of the body of a towing vehicle comprising:
   a boom pivotally mounted to said towing vehicle, said boom having a front end and a rear end;
   rack and pinion assembly means for extending and retracting said boom between a storage position wherein said boom is confined within the understructure of the body of said towing vehicle and an operating position extending out from the rear of said towing vehicle;
   means for raising and lowering said boom comprising a triangular arm pivotally attached to said vehicle body within the understructure thereof and said boom and hydraulic means attached at one end to said body and pivotally attached at the opposite end to said triangular arm;
   a crossbar pivotally mounted to the rear end of said boom;
   biasing means mounted inside of said boom operatively connected to said crossbar for normally maintaining said crossbar perpendicular to said boom;
   a wheel receiving member mounted at each end of said crossbar, each said wheel receiving member comprising a fixed prong and a movable, L-shaped prong having an inner leg and an outer leg;
   means for pivoting said movable prong between a closed storage position and an open tire receivign position for receiving and engaging a wheel of a vehicle to be towed; and
   wherein when said boom is in said storage position and said movable prongs are in said closed position, said fixed prongs are adjacent the rear end of said body and said legs of each movable prong wrap around a corner of said vehicle body.

15. A vehicle lifting and towing device as recited in claim 14, wherein the angle of said boom is in a downward slope when said boom is in an extended, raised position during lifting and towing of a vehicle and is controlled by said triangular arm.

16. A vehicle lifting and towing device as recited in claim 14, further comprising stop means on said crossbar for limiting the pivotal movement of said crossbar.

17. A vehicle lifting and towing device as recited in claim 5 which further includes a sleeve pivotally mounted to said vehicle body within the understructure thereof and said triangular arm for slidably receiving and supporting said boom.

18. A vehicle lifting and towing device as recited in claim 9 which further includes a sleeve pivotally mounted to said vehicle body within the understructure thereof and said triangular arm for slidably receiving and supporting said boom.

19. A vehicle lifting and towing device as recited in claim 14 which further includes a sleeve pivotally mounted to said vehicle body within the understructure thereof and said triangular arm for slidably receiving and supporting said boom.

20. A vehicle lifting and towing device as recited in claim 8, wherein said crossbar abuts the rear end of said towing vehicle body at a point adjacent the rear spring hangers of the vehicle.

21. A vehicle lifting and towing device as recited in claim 12, wherein said crossbar has a sprocket mounted thereon and said biasing means includes a chain in engagement with said sprocket and a tensioning means connected to each end of said chain inside of said boom.

22. A vehicle lifting and towing device for attachment to the rear of the body of a towing vehicle comprising:
   a boom pivotally mounted to said towing vehicle, said boom having a front end and a rear end;
   a crossbar pivotally mounted to the rear end of said boom;
   a sprocket mounted n said on said crossbar;
   a wheel receiving member mounted at each end of said crossbar;
   means for raising and lowering said boom; and
   biasing means mounted inside of said boom and operatively connected to said crossbar for normally maintaining said crossbar perpendicular to said boom; said biasing means including a chain in engagement with said sprocket and a tensioning means connected to each end of said chain inside of said boom.

* * * * *

UNITED STATES PATENT AND TRADEMARK OFFICE
CERTIFICATE OF CORRECTION

PATENT NO. : 4,674,943
DATED : Jun. 23, 1987
INVENTOR(S) : Nespor

It is certified that error appears in the above-identified patent and that said Letters Patent is hereby corrected as shown below:

Col. 4
Line 28, delete "verticle" and insert --vertical--.

Col. 6
Line 28, delete "booom" and insert --boom--;
Line 45, delete "movble" and insert --movable--;
Line 52, delete "reacting" and insert --retracting--;
Line 53, delete "topwing" and insert --towing--.

Col. 7
Line 12, delete "cross bar" and insert --crossbar--;
Line 15, delete "cross bar" and insert --crossbar--;
Line 20, delete "cross bar" and insert --crossbar--;
Line 21, delete "buts" and insert --abuts--;
Line 25, delete "lower in" and insert --lowering--.

Col. 8
Line 8, delete "receivign" and insert --receiving--;
Line 25, delete "5" and insert --3--.

Signed and Sealed this

Twentieth Day of October, 1987

Attest:

DONALD J. QUIGG

Attesting Officer

Commissioner of Patents and Trademarks